(12) United States Patent
Kwon

(10) Patent No.: US 7,143,616 B2
(45) Date of Patent: Dec. 5, 2006

(54) KEY INTERLOCK SYSTEM OF VEHICLE

(75) Inventor: Sang-Hun Kwon, Seoul (KR)

(73) Assignee: Hyundai Motor Company, Seoul (KR)

(*) Notice: Subject to any disclaimer, the term of this patent is extended or adjusted under 35 U.S.C. 154(b) by 216 days.

(21) Appl. No.: 10/991,215

(22) Filed: Nov. 17, 2004

(65) Prior Publication Data
US 2005/0103068 A1 May 19, 2005

(30) Foreign Application Priority Data
Nov. 18, 2003 (KR) ............ 10-2003-0081765

(51) Int. Cl.
*E05B 25/00* (2006.01)
(52) U.S. Cl. ............................ 70/252; 70/182
(58) Field of Classification Search ............... 70/252, 70/181–187, 237, 239, 245, 248, 278.7, 278.3
See application file for complete search history.

(56) References Cited

U.S. PATENT DOCUMENTS

| 5,197,312 A * | 3/1993 | Akutsu | 70/247 |
| 5,794,469 A * | 8/1998 | Suzuki | 70/252 |
| 6,439,014 B1 * | 8/2002 | Syamoto | 70/247 |
| 6,467,319 B1 * | 10/2002 | Karasik et al. | 70/186 |
| 6,604,392 B1 * | 8/2003 | Kiso et al. | 70/186 |
| 6,931,896 B1 * | 8/2005 | Ochi | 70/186 |

* cited by examiner

Primary Examiner—Brian E. Glessner
Assistant Examiner—Kristina R Gluchowski
(74) Attorney, Agent, or Firm—Morgan Lewis & Bockius LLP

(57) ABSTRACT

When a cam shaft is pivoted by interacted with a key cylinder into an ON or START state, a hooking protrusion and limit cam block maintain a disposition of the plunger. The position is retained even upon an impact or malfunction of a bidirectional solenoid actuator, thereby executing a safe key interlock system.

6 Claims, 2 Drawing Sheets

KEY INTERLOCK SYSTEM OF VEHICLE

CROSS-REFERENCE TO RELATED APPLICATIONS

The present application is based on, and claims priority from, Korean Application Serial Number 10-2003-0081765, filed on Nov. 18, 2003, the disclosure of which is hereby incorporated by reference herein in its entirety.

TECHNICAL FIELD OF THE INVENTION

The present invention generally relates to a key interlock system of a vehicle. More particularly, the key interlock system is adapted to remove the key from an ignition switch-steering column lock assembly only when the vehicle is in a parked state.

BACKGROUND OF THE INVENTION

Generally, an ignition switch-steering column lock assembly serves as an electric switch that initiates cranking of the engine via a sequential conversion of four positions including; LOCK, Accessory (ACC), ON, and START. The assembly also locks the steering column for theft prevention while in the LOCK position. The ignition switch-steering column lock assembly further has a key interlock function that prevents the key from being removed from the ignition switch-steering column lock assembly unless the vehicle is in a parked state, thus deactivating the steering column lock function when the vehicle is in motion.

Typical key interlock systems include a cam that rotates according to the rotation of the key cylinder and an electrical actuator restrains the rotation of the cam and the range thereof. The key can be released from the key cylinder only when the key cylinder is in the LOCK state, and the electrical actuator restrains the rotation range of the cam for allowing the key cylinder to pivot in the LOCK state only when the vehicle shift lever is in the Park (P) state.

The electrical actuator can be either a unidirectional solenoid actuator or a bidirectional solenoid actuator. The unidirectional solenoid actuator uses magnetic force from an electromagnet for one-way linear movement of the plunger and the other linear movement thereof relies on force generated from a spring. The bidirectional solenoid actuator applies the magnetic force of the electromagnet to linear movements of the two-way directions thereof.

SUMMARY OF THE INVENTION

Embodiments of the present invention improve the reliability of an ignition switch-steering column lock assembly that controls, via a bidirectional solenoid actuator, a rotation range of a cam interacting with a key cylinder into which the key is inserted.

A key interlock system of a vehicle includes a cam shaft that pivots by being interacted with a key cylinder, into which a key is inserted. A bidirectional solenoid actuator is equipped with a plunger that linearly reciprocates in a vertical direction of the cam shaft. A lock cam block protrudes from the cam shaft in a radial direction of the cam shaft and is locked with the plunger to prevent the key cylinder from rotating to a LOCK state. A hooking protrusion protrudes out from one end of the plunger in the identical direction to the cam shaft. A limit cam block is mounted around the cam shaft to restrain linear movement of the plunger by being blocked via the hooking protrusion when the key cylinder is in an ON or START state.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Figure 1:
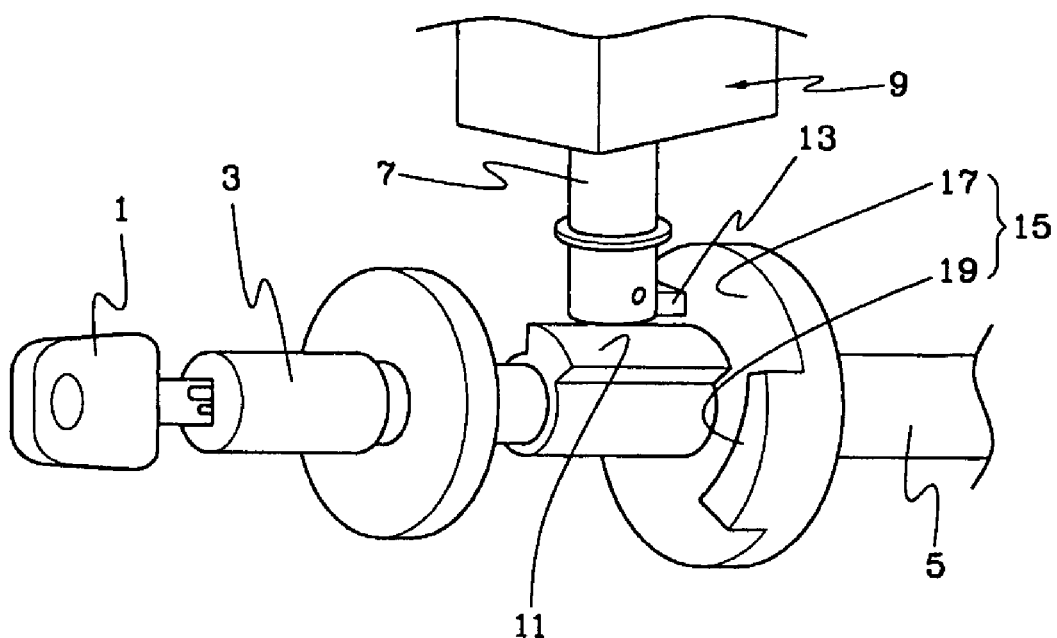
FIG. 1 illustrates a key interlock system of a vehicle according to an embodiment of the present invention.

Referring to FIG. 1, a key interlock system of a vehicle includes a key cylinder 3, into which a key 1 is inserted. The key cylinder 3 interacts with and pivots a cam shaft 5. A bidirectional solenoid actuator 9 is equipped with a plunger 7 that linearly reciprocates in a vertical direction of the cam shaft 5. A lock cam block 11 protrudes out from the cam shaft 5 in a radial direction of the cam shaft 5. The lock cam block 11 thereby prevents the key cylinder 3 from rotating to a LOCK state when the lock cam block 11 interacts with the plunger 7. A hooking protrusion 13 protrudes from one end of the plunger 7 in the direction of the cam shaft 5. A limit cam block 15 is installed at the cam shaft 5 to restrain linear movement of the plunger 7 by being blocked via the hooking protrusion 13 when the key cylinder 3 is in an ON or START state.

The key cylinder 3 is configured to remove the key 1 from the key cylinder 3 only in the LOCK state. The key cylinder 3 pivots from the LOCK state to ACC, ON and START.

The bidirectional solenoid actuator 9 is activated by an electrical power source and restrains pivot of the lock cam block 11 by linearly and closely moving the plunger 7 to the cam shaft 5. The bidirectional solenoid actuator 9 also linearly and remotely moves the plunger 7 from the cam shaft 5 to allow the lock cam block 11 to pivotably move.

The lock cam block 11 protrudes from the outer circumference of the cam shaft 5 and has a sector-shaped cross section. The limit cam block 15 is constituted by a disc plate 17 and limit part 19. The disc plate 17 is formed in a circular plate shape and is pierced at the middle thereof by the cam shaft 5. The limit part 19 protrudes out from the disc plate 17 toward the lock cam block 11 direction. The limit part 19 is placed at an edge of the disc plate 17 in the radial direction thereof. Therefore, when the plunger 7 closely moves to the cam shaft 5, the limit part 19 does not interrupt with the hooking protrusion 13, thereby enabling the cam shaft 5 to pivot.

Figure 2:
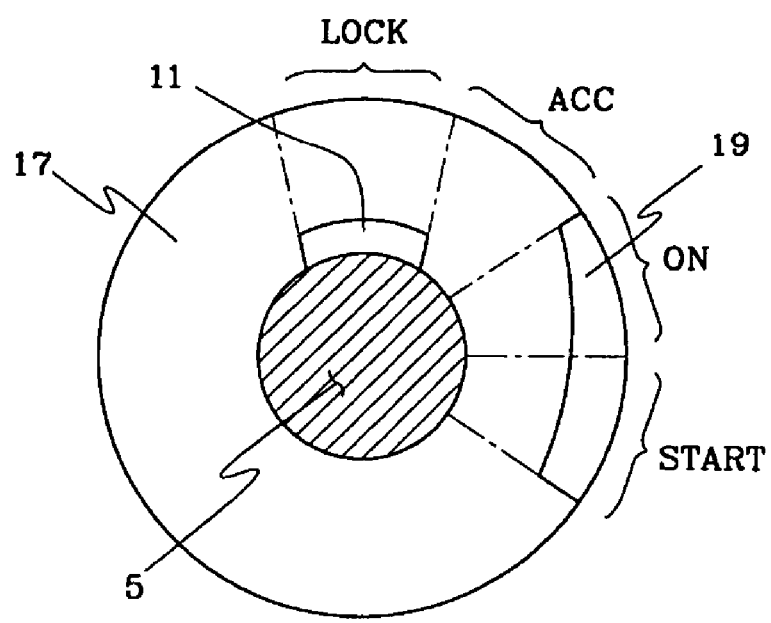
FIG. 2 depicts dispositions of a lock cam block and limit cam block according to an embodiment of the present invention.

According to FIG. 2, the lock cam block 11 and limit cam block 15 are disposed in the cam shaft 5 direction. The LOCK, ACC, ON and START are delineated at contact points of the plunger 7 and the cam shaft 5, when the cam shaft 5 pivots. In the ACC state, the plunger 7 is not disturbed by the limit cam block 15 and lock cam block 11, thus the plunger 7 can linearly and either closely or distantly move from the cam shaft 5.

Figure 3:
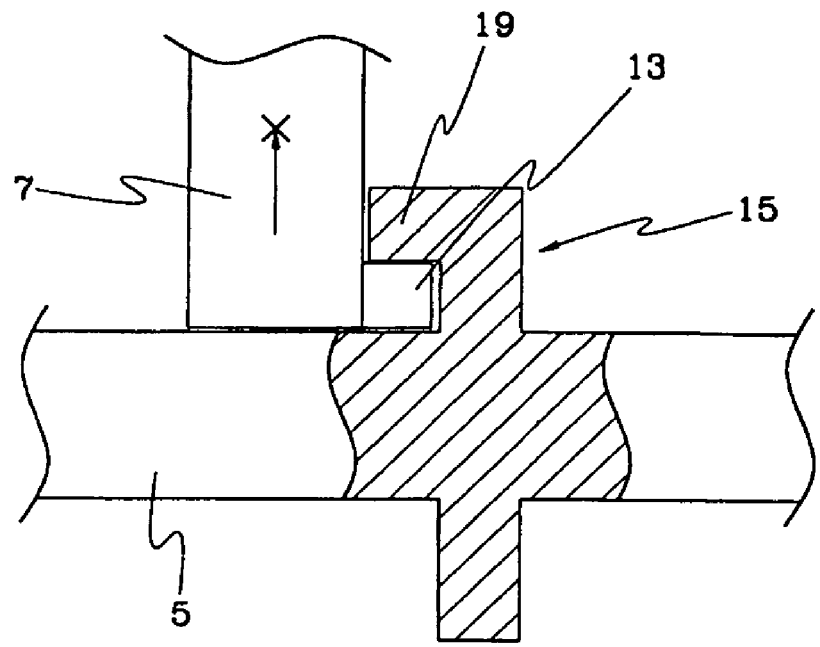
FIG. 3 illustrates a hooking protrusion formed at a plunger of a bidirectional solenoid actuator blocked by a limit part of a limit cam block according to an embodiment of the present invention.

As illustrated in FIG. 3, when the cam shaft 5 is in the ON or START state, the hooking protrusion 13 is blocked by the limit cam block 15. Therefore, the plunger 7 is prevented from remotely moving from the cam shaft 5 due to the exterior impact or malfunction of the bidirectional solenoid actuator 9. When the driver suddenly tries to rotate the key 1 to the LOCK state while the vehicle is in motion, the plunger 7 restrains the pivot movement of the lock cam block 11 such that the key 1 cannot be removed from the key cylinder 3 as the LOCK state is not formed.

Figure 4:
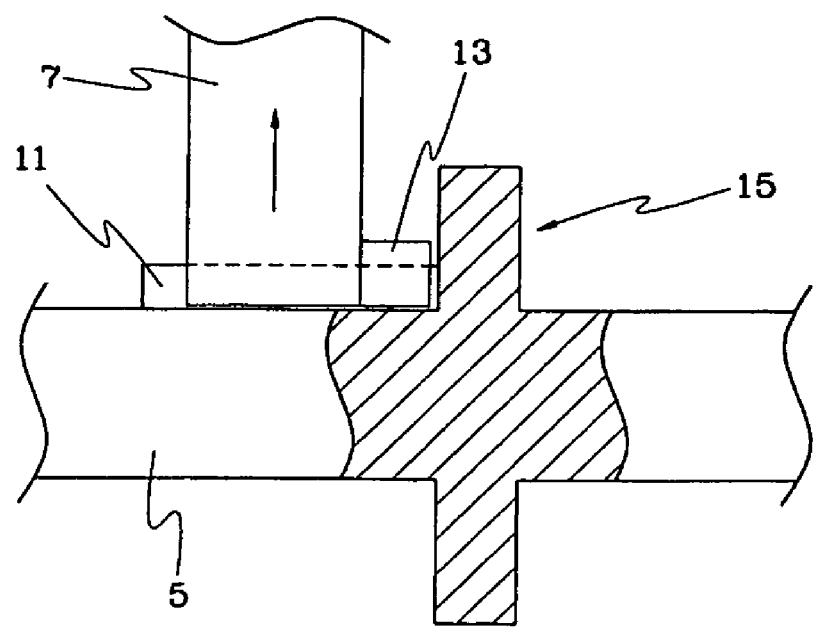
FIG. 4 illustrates a plunger of a bidirectional solenoid actuator being raised without interruption of a limit cam block according to an embodiment of the present invention.

In order for the cam shaft 5 to pivot from the ON or START state to the LOCK state, the cam shaft 5 should be shifted to the ACC state by pivoting the cam shaft 5, as shown in FIG. 4. Next, the plunger 7 should be linearly and remotely moved from the cam shaft 5. As the plunger 7 of the bidirectional solenoid actuator 9 distantly moves from the cam shaft 5, when the shift lever is in P range, the key 1 can be removed from the key cylinder 3 only when the vehicle is in a parked state.

As is apparent from the foregoing, there is an advantage in the present invention in that when a cam shaft is in the ON or START state, the hooking protrusion and limit cam block maintain the disposition of the plunger even upon an exterior impact or a malfunction of the bidirectional solenoid actuator, thereby stabilizing operation of the key interlock system.

What is claimed is:

1. A key interlock system of a vehicle, comprising:
   a cam shaft that pivots by interaction with a key cylinder into which a key is inserted;
   a bidirectional solenoid actuator equipped with a plunger that linearly reciprocates in a vertical direction of said cam shaft;
   a lock cam block protruding from said cam shaft in a radial direction of said cam shaft and being locked with said plunger to prevent said key cylinder from rotating to a LOCK state;
   a hooking protrusion protruding out from one end of said plunger in the identical direction to said cam shaft; and
   a limit cam block mounted around said cam shaft to restrain linear movement of said plunger by being blocked via said hooking protrusion when said key cylinder is in an ON or START state.

2. The system as defined in claim 1, wherein said lock cam block protrudes from the outer circumference of said cam shaft and has a sector-shaped cross section.

3. The system as defined in claim 1, wherein said limit cam block comprises:
   a disc plate formed in a circular plate shape and pierced at the middle thereof by said cam shaft; and
   a limit part protruding out from said disc plate toward said lock cam block direction.

4. A key interlock system of a vehicle, comprising:
   a cam shaft pivotable through interaction with a key cylinder;
   a bidirectional solenoid actuator having a plunger, wherein the plunger linearly reciprocates perpendicular to the axial direction of the cam shaft;
   a lock cam block protruding from said cam shaft in a radial direction, wherein the lock cam block interacts with the plunger to prevent the key cylinder from rotating to a LOCK position;
   a hooking protrusion protruding from one end of the plunger in the axial direction of the cam shaft; and
   a limit cam block coupled about the cam shaft to restrain linear movement of the plunger by interaction with the hooking protrusion when the key cylinder is in an ON or START position.

5. The system as defined in claim 4, wherein said lock cam block protrudes from an outer circumference of said cam shaft and has a sector-shaped cross section.

6. The system as defined in claim 4, wherein said limit cam block comprises:
   a disc plate formed in a circular plate shape and pierced at the middle thereof by said cam shaft; and
   a limit part protruding out from said disc plate toward said lock cam block direction.

* * * * *